March 10, 1970 H. HIRSCHBERG 3,500,147
DISK VARIABLE TRIMMER CAPACITOR HAVING INTEGRAL STATOR
ELECTRODE AND STATOR TERMINAL
Filed Aug. 12, 1968 3 Sheets-Sheet 1
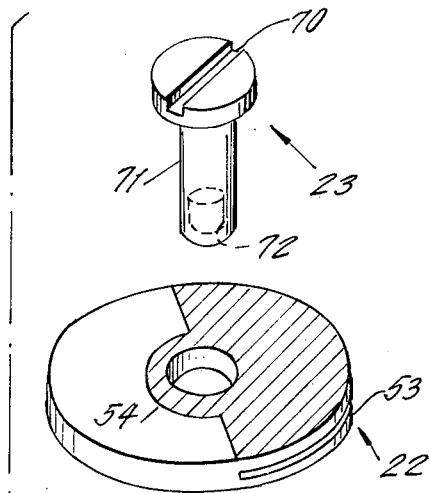
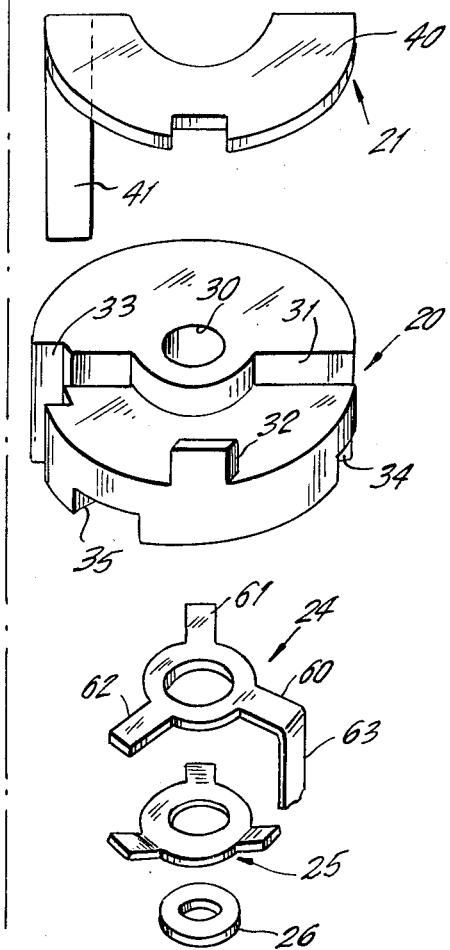
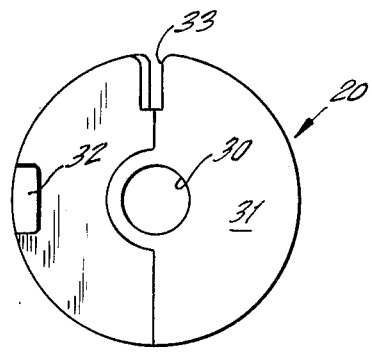
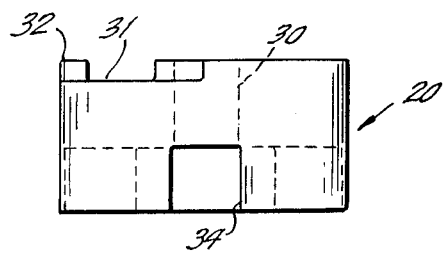
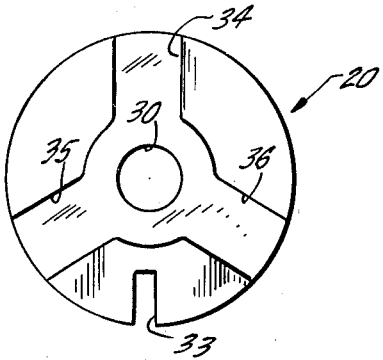
INVENTOR.
HERZ HIRSCHBERG
BY
OSTROLENK, FABER, GERB & SOFFEN
ATTORNEYS

INVENTOR.
HERZ HIRSCHBERG
BY
OSTROLENK, FABER, GERB & SOFFEN
ATTORNEYS

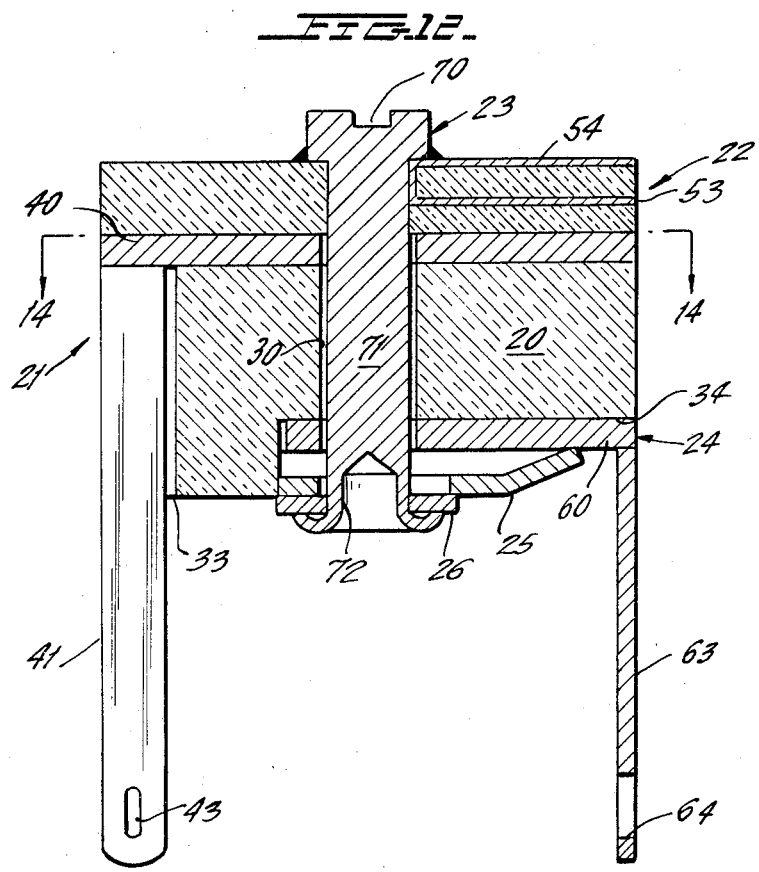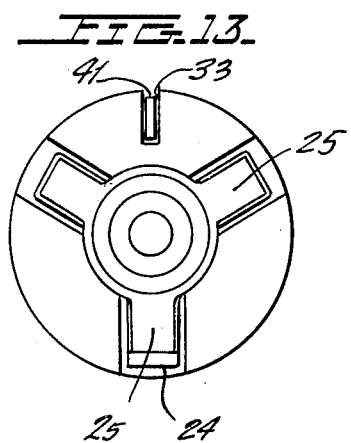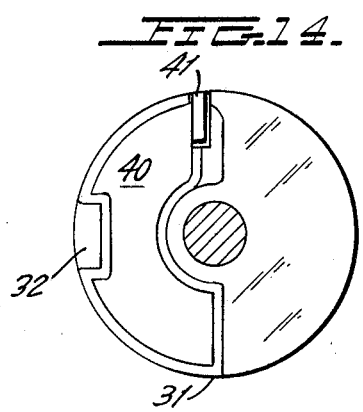

United States Patent Office 3,500,147
Patented Mar. 10, 1970

3,500,147
DISK VARIABLE TRIMMER CAPACITOR HAVING INTEGRAL STATOR ELECTRODE AND STATOR TERMINAL
Herz Hirschberg, New York, N.Y., assignor to JFD Electronics Corporation, Brooklyn, N.Y., a corporation of Delaware
Filed Aug. 12, 1968, Ser. No. 751,825
Int. Cl. H01g 5/06
U.S. Cl. 317—249                            5 Claims

ABSTRACT OF THE DISCLOSURE

A miniature ceramic disk trimmer capacitor stator construction in which the upper surface of the stator has a semicircular depression which receives a semicircularly-shaped stator electrode form. The stator electrode form has a downwardly bent terminal lug portion which extends to below the lower surface of the stator. The stator electrode form is suitably secured to the upper surface of the stator body as by cementing or soldering, and the upper surface of the stator is thereafter polished to form a smooth, continuous upper surface for the stator.

---

This invention relates to miniaturized ceramic disk variable capacitors, and more particularly relates to a novel stator construction for such trimmer devices.

Miniaturized ceramic disk variable capacitors are well known in the art. One such device is shown in the patent to Wallace, 3,244,951, issued Apr. 5, 1966, and assigned to the assignee of the present invention.

When manufacturing the stator of a miniaturized trimmer capacitor where the stator will have a diameter of about .20 inch, the stator electrode is commonly painted or printed onto the flat, upper face of a ceramic stator body, and the body is thereafter fired. Terminal connections are then made to the stator conductive surface by a soldering process of a separate lead wire which must be mechanically and electrically secured to the stator. Because of the small size of the stator body, this construction has presented many production problems such as solidly connecting the terminal lug to the stator to prevent mechanical breakage and establishing good electrical connection between the stator electrode and the lug.

In accordance with the present invention, the stator electrode and terminal body for a miniaturized variable ceramic disk capacitor are formed of a single, unitary body in which the terminal represents an extension of a generally semicircularly-shaped stator electrode body. The stator electrode body is then fitted within a suitable depression in the upper surface of the stator ceramic body, and the two are bonded as by cementing or soldering, or the like, with the terminal lug being bent downwardly and perpendicular to the plane of the upper surface of the stator. The upper surface of the stator may then be lapped and polished flat so that the top of the conductive insert lies flush with the top of the ceramic material of the stator. In order to rigidly hold the stator electrode in position on top of the stator ceramic body and also to facilitate said lapping and polishing operation, a protrusion can extend from the outer periphery of the stator body.

This construction will then provide a stator arrangement which has improved reliability in that it insures secure anchoring of the stator electrode within the stator ceramic body, and additionally provides extremely reliable connection between the stator electrode surface and the terminal lug extending therefrom. It has also been found that this arrangement improves the Q factor at higher frequencies because of the avoidance of the soldered connection between the lug and the stator electrode surface.

This construction also provides the securing of the lug into the stator body where it is soldered or cemented into an axial slot. This prevents one common failure of such devices, namely, the breaking loose of the lug from the stator electrode.

The grinding and polishing technique used to make the upper surface of the stator a flush, flat surface with a very high surface finish minimizes friction between the stator and rotor surfaces and decreases the air gap between the stator and rotor, thereby permitting a higher maximum capacitance for the miniaturized unit.

The simplicity of assembly and construction are obvious advantages, and do not require skilled labor for the assembly of the device.

Accordingly, a primary object of this invention is to provide an improved miniaturized variable disk ceramic trimmer having a unitary stator electrode and stator terminal lug.

Another object of this invention is to increase the reliability of a miniaturized variable disk ceramic trimmer.

Yet another object of this invention is to simplify the manufacturing techniques of a miniaturized variable disk ceramic trimmer capacitor.

Still another object of this invention is to avoid a soldered connection to the stator electrode in a variable disk ceramic trimmer capacitor and to increase the Q of such capacitors.

A further object of this invention is to increase the capacitance range of a miniaturized variable disk ceramic trimmer capacitor.

These and other objects will become apparent from the following description when taken in connection with the drawings in which:

FIGURE 1 is an exploded perspective view of a trimmer capacitor which is miniaturized and incorporates the stator construction of the present invention.

FIGURE 2 is a top plan view of the stator ceramic body.

FIGURE 3 is a front view of FIGURE 2.

FIGURE 4 is a bottom view of FIGURE 3.

FIGURE 12 is a cross-sectional view of the assembled capacitor of FIGURE 1.

FIGURE 13 is a bottom view of the capacitor of FIGURE 12.

FIGURE 14 is a cross-sectional view of the capacitor of FIGURE 12 taken across the section line 14—14 in FIGURE 12.

Figure 5:
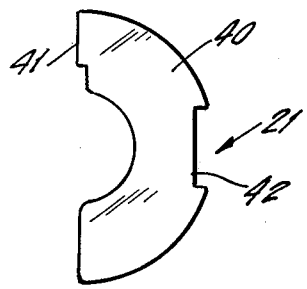
FIGURE 5 is a top view of the semicircular electrode structure which is to be incorporated with the stator body of FIGURES 2 to 4.

Referring first to FIGURE 1, there is generally shown each of the components used in the trimmer capacitor which consist of ceramic stator body 20, stator electrode 21, rotor 22, assembly rivet 23, rotor terminal 24, pressure spring 25, and washer 26. Stator 20, shown in FIGURES 1 to 4 and 12 to 14, consists of a pressed and fired ceramic of any suitable composition commonly used for capacitors and, when used for the miniaturized capacitor of the present invention, will have a diameter of about .20 inch and a thickness of about .100 inch, when used for trimmer capacitors.

Stator body 20 has a central opening 30 and a semicircular depression 31 around one half of its upper surface. An extending post 32 having a height equal to the total height of the semicircular depression extends from an outer peripheral portion of depression 31. The side slot 33 is provided for ultimately receiving a stator electrode terminal lug and three radiating slots 34, 35 and 36 are provided in the bottom of the stator body 20 for receiving the rotor terminal and tensioning structure, as will be described.

Figure 7:
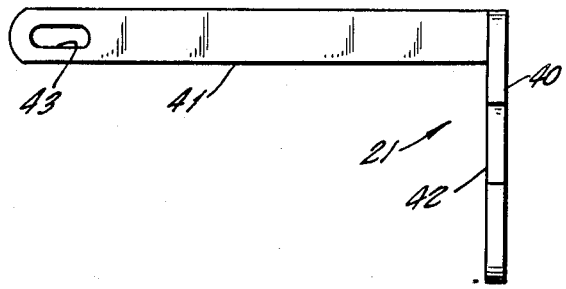
FIGURE 7 is a side view of the stator body of FIGURE 5 as seen from the left-hand side of FIGURE 5.
Figure 6:
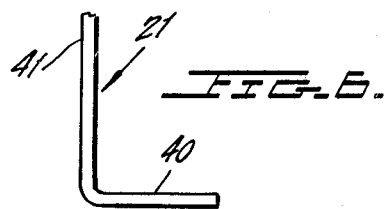
FIGURE 6 is a front view of the stator electrode of FIGURE 5.
Figure 8:
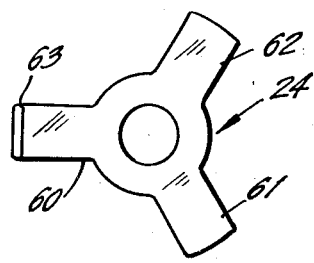
FIGURE 8 is a top view of the rotor electrode stamping used in FIGURE 1.
Figure 9:
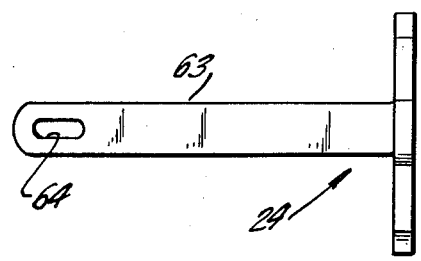
FIGURE 9 is a side view of the rotor electrode of FIGURE 8.
Figure 10:
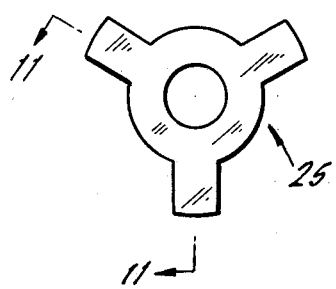
FIGURE 10 is a top view of the pressure spring used in the assembly of FIGURE 1.
Figure 11:
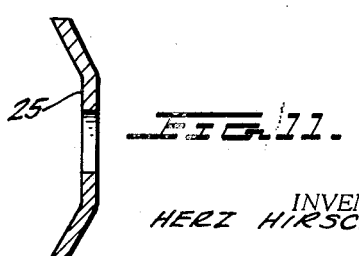
FIGURE 11 is a cross-sectional view of FIGURE 10 taken across the section line 11—11 in FIGURE 10.

The stator terminal which is received in depression 31 in stator body 20 consists, as shown in FIGURES 1 and 5 to 7, of a stamping which may be of a suitable metal such as brass, copper or silver, having a semicircular body portion 40 and an extending leg 41 extending downwardly therefrom which is integral with body 40. Stamping 40 may have a thickness of .015 inch as compared to the depth of depression 31 which is .012 inch. A notch 42 is provided in the outer periphery of body 40 which cooperates with extension 32 in the stator body 20. A terminal opening 43 may be provided in the end of leg 41 to facilitate connection of lead wires to the leg 41.

Stator body 20 and its stator electrode 21 are bonded together in a separate subassembly step where body 40 is suitably fitted into depression 31 with terminal leg 41 extending into slot 33. The two are bonded together as by cementing with an appropriate organic or ceramic cement in a process well-known to those skilled in the art. Alternatively, the thin metal stator electrode 21 can be fired into depression 31 with the depression being suitably metallized prior to the firing operation. It is also possible to soft-solder the electrode 21 into place within depression 31 with a suitable soldering alloy where all surfaces to be bonded in the soldering process would be initially coated with metal prior to the soldering operation. The same bonding, firing, cementing or soldering method will apply for securing of terminal leg 41 in slot 33.

After bonding of stator body 20 and stator electrode 21, the upper surface of the combined unit will be flat-lapped or ground so that the assembly presents a single flat, parallel surface which can accommodate a cooperating rotor with a virtually negligible air gap, assuming that the cooperating rotor surface is suitably ground flat.

The rotor 22 is shown in FIGURES 1 and 12, and may be made as described in previously mentioned U.S. Patent 3,244,951 wherein the rotor body 22 contains an embedded electrode 53 which communicates with an upper electroded surface portion 54. This process permits an extremely small dielectric thickness to exist between electrode 53 and the bottom surface of the rotor. The bottom surface of rotor 22 will be suitably polished or ground flat by any conventional technique.

A three-pronged stamping 24 then serves as the rotor terminal where the prongs 60, 61 and 62 nest within slots 34, 36 and 35, respectively, in the bottom of stator body 20. Prong 60 carries a downwardly bent extending portion 63 which serves as the rotor terminal and may have a lead-receiving aperture 64 at the end thereof. A three-pronged pressure spring 25 fits directly below the three-pronged rotor terminal structure 24, as shown best in FIGURE 13, with the pressure spring 25 biasing the various components of the capaictor toward engagement with one another. The assembly is held together by the adjustment rivet 23 which has a slotted or suitable tool-receiving head 70 and a downwardly extending conductive shank 71 having a hollow end 72, as best shown in FIGURE 1.

In assembling the capacitor and as best understood from FIGURES 1 and 12, the shank 71 of rivet 23 is inserted through the aligned central openings in rotor 22, stator body 20, rotor terminal 24, spring 25 and washer 26. The hollow end 72 of rivet 23 is then turned outwardly over washer 26, thereby to capture all of the components and to press the components together through spring 25.

The upper head of rivet 23 is then suitably soldered to the conductive surface 54, thereby to make electrical connection from the rivet 23 to the rotor electrode 53. The rotor electrode 53 is further connected through the rivet 23, washer 26 and spring 25 to the rotor terminal structure 24. Thus, the completed device offers two terminals for making electrical connection to the capacitor; the stator leg 41 of the stator terminal structure and leg 63 of the rotor terminal structure. Note that these legs are aligned perpendicular to one another, thereby serving to identify the stator and rotor terminal connections.

In order to operate the device, a screw-driver head, or other similar adjustment tool, is caused to rotate rivet 23, thereby to rotate the entire rotor body 22. This alters the alignment of the semicircular-shaped rotor electrode 53 with respect to the semicircularly-shaped stator electrode portion 40, thereby to vary the capacitance between these two members.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In a variable disk trimmer capacitor; a rotor body consisting of a flat dielectric disk carrying a rotor electrode, a stator body consisting of a generally flat dielectric disk carrying a stator electrode thereon, and securement means for rotatably securing said rotor body to said stator body coaxially to one another and in surface-to-surface contact with one another; the upper surface of said stator body having a generally semicircular depression therein having a bottom surface parallel to the upper surface of said stator body; said stator electrode consisting of a flat, thin, self-supporting conductive body having an integral extending terminal lug extending from the edge thereof; said flat, thin, conductive body conforming to the shape of said semicircular depression and being secured within said semicircular depression; the top surface of said flat, thin, conductive body being coplanar with said upper surface of said stator body; said stator body having a locating lug extending upward from an outer peripheral portion of said depression; said flat conductive body of said stator electrode having a notch in the periphery thereof for receiving said locating lug.

2. The device of claim 1 wherein said stator body has a notch in the side thereof; said extending terminal lug bent perpendicular to the plane of said conductive body and received and secured in said notch.

3. The device as set forth in claim 2 wherein said securement means includes an adjustment shaft having a head portion and shank portion, and a biasing spring; said biasing spring consisting of a flat body having a plurality of radiating arms; said adjustment shaft extending through said rotor body, stator body and biasing spring; said adjustment shaft secured to said rotor body and rotatable therewith; the bottom of said stator body having a plurality of slot depressions receiving said radiating arms of said biasing spring; said shank portion of said adjustment shaft connected to said biasing spring and rotatable with respect thereto; said biasing spring forcing said stator and rotor bodies toward one another.

4. In a variable disk trimmer capacitor; a rotor body consisting of a flat dielectric disk carrying a rotor electrode, a stator body consisting of a generally flat dielectric disk carrying a stator electrode thereon, and securement means for rotatably securing said rotor body to said stator body coaxially to one another and in surface-to-surface contact with one another; the upper surface of said stator body having a generally semicircular depression therein having a bottom surface parallel to the upper surface of said stator body; said stator electrode consisting of a flat, thin, self-supporting conductive body having an integral extending terminal lug extending from the edge thereof; said flat, thin, conductive body conforming to the shape of said semicircular depression and being secured within said semicircular depression; the top surface of said flat, thin, conductive body being coplanar with said upper surface of said stator body; said securement means including an adjustment shaft having a head portion and shank portion, and a biasing spring; said biasing spring consisting of a flat body having a plurality of radiating arms; said adjustment shaft extending through said rotor body, stator body and biasing spring; said adjustment shaft secured to said rotor body and rotatable therewith; the bottom of said stator body having a plurality of slot depressions receiving said radiating arms of said biasing spring; said shank portion of said adjustment screw connected to said biasing spring and rotatable with respect thereto; said biasing spring forcing said stator and rotor bodies toward one another.

5. The device of claim 4 which includes a rotor terminal structure interposed between the bottom of said stator body and said biasing spring; said rotor terminal structure having an elongated terminal lug extending therefrom.

References Cited

UNITED STATES PATENTS

| | | | |
|---|---|---|---|
| 2,219,003 | 10/1940 | Braunschweg | 317—249 |
| 3,202,889 | 8/1965 | Matsui. | |
| 3,379,943 | 4/1968 | Breedlove. | |

FOREIGN PATENTS

| | | |
|---|---|---|
| 726,958 | 3/1953 | Great Britain. |

OTHER REFERENCES

Ser. No. 398,524, A.P.C., published May 1943.

German printed application to Rosenthal, published July 1965, Ser. No. 1,196,792.

ELLIOT A. GOLDBERG, Primary Examiner